United States Patent [19]

Sorenson

[11] Patent Number: 4,461,938
[45] Date of Patent: Jul. 24, 1984

[54] SWITCH CASE CONSTRUCTION

[75] Inventor: Richard W. Sorenson, Avon, Conn.

[73] Assignee: Carlingswitch, Inc., West Hartford, Conn.

[21] Appl. No.: 412,765

[22] Filed: Aug. 30, 1982

[51] Int. Cl.³ .............................................. H01H 9/02
[52] U.S. Cl. .................................. 200/296; 200/295; 248/27.3
[58] Field of Search ................ 200/295, 296, 339, 293; 248/27.1, 27.3; 220/3.7, 3.8, 287; 174/52 R, 54, 57

[56] References Cited

U.S. PATENT DOCUMENTS

| | | | |
|---|---|---|---|
| 2,760,672 | 8/1956 | Cronheim | 220/287 |
| 2,973,175 | 2/1961 | Appleton | 248/27.1 |
| 3,308,260 | 3/1967 | Krieger et al. | 200/339 X |
| 3,403,236 | 9/1968 | Zoludow | 200/339 X |
| 3,501,599 | 3/1970 | Horecky | 200/295 X |
| 3,606,074 | 9/1971 | Hayes | 220/287 |
| 3,701,870 | 7/1972 | Sorenson | 200/295 |
| 3,706,869 | 12/1972 | Sorenson | 200/295 |
| 3,807,457 | 4/1974 | Logsdon | 220/287 X |
| 4,121,071 | 10/1978 | Campbell et al. | 200/339 X |
| 4,211,905 | 7/1980 | Quigley | 200/295 |
| 4,340,795 | 7/1982 | Arthur | 200/295 |

Primary Examiner—Stephen Marcus
Assistant Examiner—Ernest G. Cusick
Attorney, Agent, or Firm—McCormick, Paulding & Huber

[57] ABSTRACT

A rectangular switch case has integrally attached resilient wings adjacent its four corners and each wing has an upper free end portion with mutually perpendicular side and end surfaces which define seriated steps for engaging the opposed sides or ends of various size openings in panels of various thicknesses.

5 Claims, 7 Drawing Figures

SWITCH CASE CONSTRUCTION

This invention relates generally to electric switch cases with integrally formed resilient wings for securing such switch cases in panel openings, and deals more particularly with uniquely shaped wings which are not only capable of accommodating a given switch case in openings defined by panels of different thicknesses, but are also able to secure such a switch case in openings of various size.

Switch cases with integrally formed wings for retaining the case in panel openings are disclosed in Sorenson U.S. Pat. Nos. 3,701,870 and 3,706,869. However, these prior art patents do not show or suggest resilient wings which are so designed as to secure a given switch case in panel openings of different size.

In the preferred embodiment described and claimed herein the switch case is generally rectangular with an upwardly open cavity for the switch components and a peripherally extending flange projecting outwardly of the case to engage the front of the panel when one case is provided in an opening. Opposed pairs of side and end walls are integrally joined at their adjacent vertical edges to form four corners, and a bottom wall is integrally connected to the bottom edges of these side and end walls. Four resilient wings are integrally connected to these bottom edges and each wing projects upwardly and outwardly with respect to an associated corner so that the upper end portion thereof will be resiliently biased, upon insertion of the case in a panel opening, to move toward an adjacent end or side wall of its associated corner. Each wing upper end portion has side and end surfaces which are mutually perpendicular, and which define seriated steps for engaging either the sides or the ends of the rectangular panel opening into which the switch case is to be mounted. The range of opening sizes in which the switch case can be mounted is such that the wings engage the shorter sides of the rectangular openings when the case is mounted in larger size panel openings and the longer sides in smaller panel openings.

Figure 3:
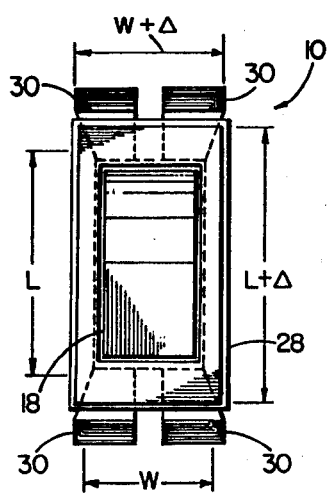
FIG. 3 is a top plan view of the switch case of FIG. 2, with a rocker provided therein to actuate the conventional components inside the case.
Figure 4:
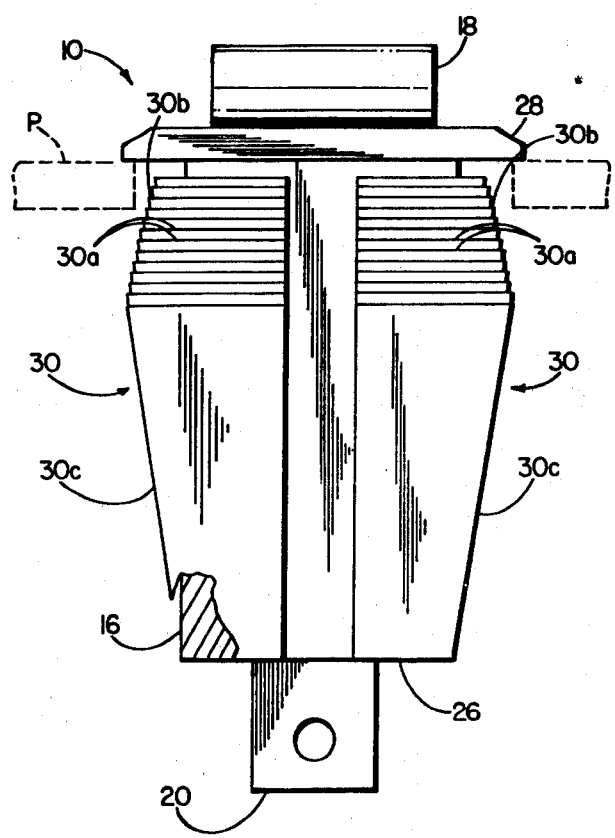
FIG. 4 is an enlarged elevational end view of the switch case of FIG. 3 with a portion broken away.

Referring now to the drawings in greater detail, and particularly to FIG. 2, a switch case 10 of molded bakelite or nylon is shown from below to best illustrate its generally rectangular shape. Opposed pairs of side 12, 12 and end walls 14, 14 are integrally connected at their adjacent vertical edges to form the four corners 16, 16 of an upwardly open housing for the various internal switch components. Only one such component is shown in FIGS. 3 and 4, rocker 18 is pivotally provided in the open housing between the above described side and end walls 12 and 14. Conductive posts 20 and 22 are provided in the bottom wall 26 of the switch case, and a third slot 24 in bottom wall 26 may also have such a post where the switch will have a center OFF position and two ON positions as well. Alternatively, and as shown, this portion of the switch may simply serve as an electrically non-conductive portion of the switch where a simple ON/OFF function is to be achieved.

Figure 5:
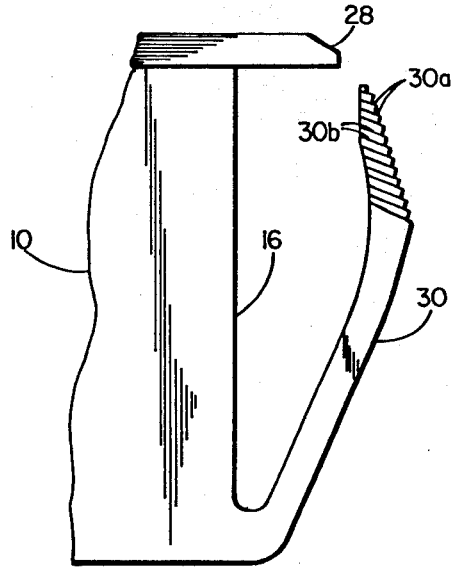
FIG. 5 is a side elevational view of one end portion, the FIG. 4 switch showing one of the resilient wings in its normal undeformed condition.
Figure 6:
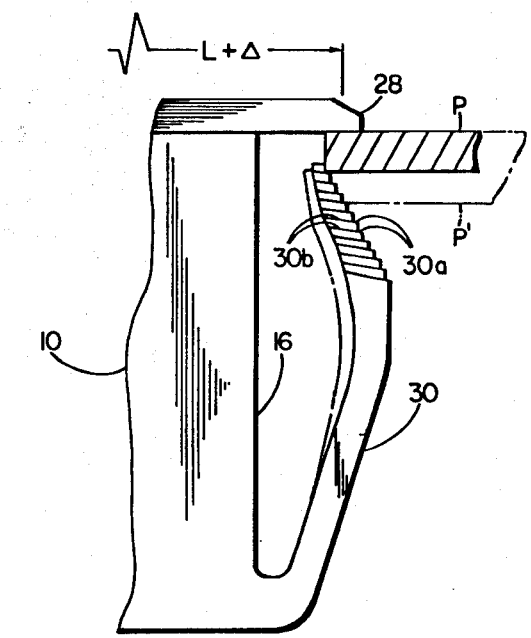
FIG. 6 is a view similar to FIG. 5 but showing the end portion and wing of the FIG. 5 switch mounted in a panel opening of size (L+Δ)×(W+Δ).
Figure 7:
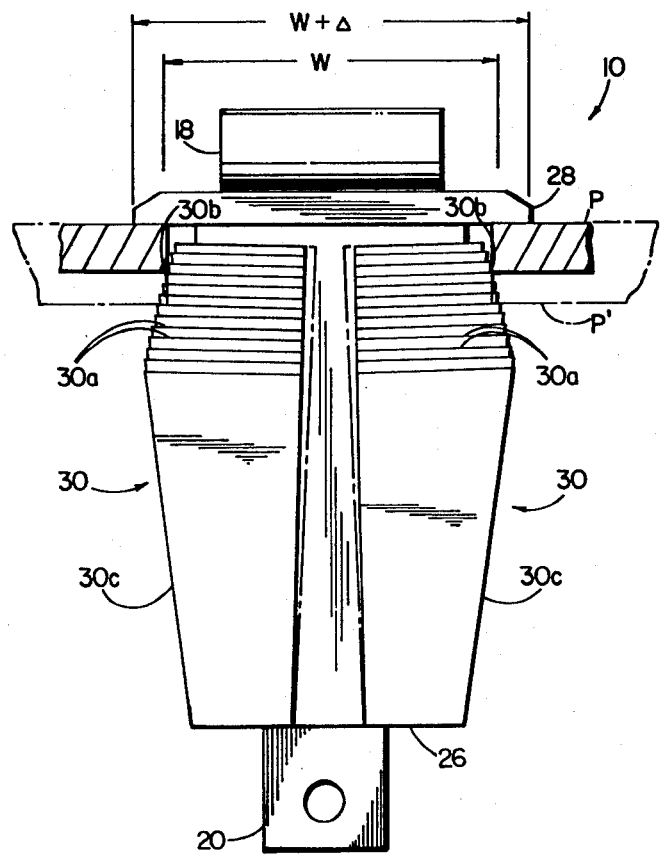
FIG. 7 is an end view of the switch shown in FIG. 4 but with the wings deflected toward one another to illustrate the wing configuration with the switch case mounted in a panel opening of size L×W. These wings can be further deflected, as suggested by the phantom lines, to show their configuration in a thicker panel.

The switch case 10 also has a conventionally formed peripheral flange 28 extending around the upper edges of the side and end walls 12 and 14. This flange projects outwardly to engage the front face of the panel P or P' when the case is mounted in a panel opening as best shown in FIGS. 6 and 7. The chief aim of the present invention is to provide resilient wings 30, 30 adjacent the four corners 16, 16 of the switch case such that these wings are adapted to be bent either toward the ends 16 of the case 10 as suggested in FIGS. 5 and 6, or toward each other as shown in FIG. 7, depending upon the rectangular dimensions of the panel opening, that is (L+Δ)×(W+Δ), or L×W.

Figure 1:
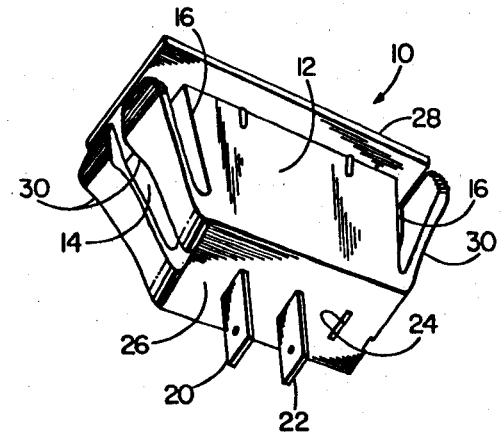
FIG. 1 is a bottom perspective view of a switch case having wings of the present invention to fit the case in openings as shown in FIG. 2.
Figure 2:
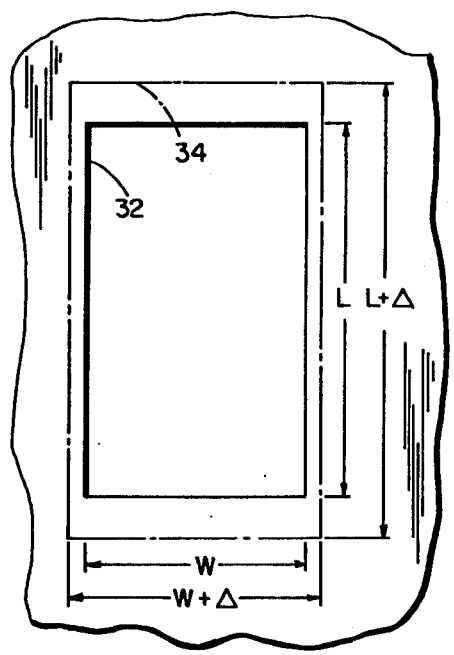
FIG. 2 illustrates a panel having a rectangular opening of size L×W and in phantom lines a larger opening, also of rectangular shape, to show the size range of panel openings in which a switch case of the present invention may be mounted.

FIG. 2 shows a panel opening 32 of rectangular configuration with the longer side of length L and the shorter end of length W. This view also shows a slightly larger opening 34 of side dimension (L+Δ) and of end dimension (W+Δ). The relative size of the switch case 10 in comparison to these dimensions is best shown in FIG. 3, and in FIG. 7 where the smaller opening has a width W (an length L not shown). FIG. 6 illustrates the larger opening of length (L+Δ) and width W+Δ (not shown). As will be apparent from FIGS. 6 and 7 the wings 30, 30 deflect differently depending upon whether one is inserting the switch case 10 is in the larger (FIG. 6) or the smaller size (FIG. 7) panel opening. So too the thickness of the panel P/P' also has an affect on the deflection of the wings 30, 30 but only as to the degree of deflection.

In FIG. 6 the wing 30 is deflected to accommodate itself to the panel opening in much the same manner as was true for the wings on prior art switch cases generally. In spite of the different geometry of the wings 30, 30 in the present invention these wings need only deflect toward and away from the end 16 of switch case 10 when the case is being mounted in a larger size panel opening, such as that shown at 34 in FIG. 2 and at (L+Δ)×(W+Δ) in FIG. 5. Seriated steps 30a, 30a are defined in the upper end portions of the fingers 30, 30 and each step has a flange or face, which is parallel to the flange 28, so that the wings will securely hold the case in the panel opening as taught by various prior art patents including my own U.S. Pat. No. 3,706,869 which is incorporated by reference herein.

Instead of wings 30, 30 being provided wholly within the outside dimensions of the switch case side walls 12, 12 as was true in prior art U.S. Pat. No. 3,706,869, the wings 30, 30 of the switch case 10 described and shown in the drawings extend or project beyond these side walls as shown in FIG. 4. As there shown the outside edges of the wings 30, 30 do taper inwardly adjacent their upper end portions and it is an important feature of the present invention that these portions 30b, 30b do not engage the edges of the larger opening (see FIG. 4) but that they do engage the edges of the smaller width opening as shown in FIG. 7.

In a comparison of FIGS. 4 and 7 it will be seen that the wings 30, 30 are adapted to flex toward one another so that the steps or flanges 30a, 30a are no longer horizontal and hence will not properly act upon the short sides of the smaller opening in panel P. The edges 30b, 30b instead serve to secure the case in the smaller opening by engaging the longer opening sides as best shown in FIG. 7. This view also shows that the degree of deflection of these wings 30, 30 coupled with the successive steps 30b, 30b in the outside edges of these wings will accommodate panels of various thickness P/P'.

In conclusion then the present invention provides resilient wings at opposite ends of a molded plastic switch case, the lower ends of such wings being integrally connected to the lower edges of the end walls of the housing and extending upwardly and outwardly with respect thereto. As so configured these wings have upper portions to provide support for the switch case in large openings by reason of the inwardly tapered steps 30a, 30a. In accordance with the present invention these wings also have inclined steps 30b, 30b defined by inwardly tapered edge portions of the wings, and it is important to note that these latter steps 30b, 30b are located outside of the planar sides 12, 12 of the case 10 so that they tend to support the case equidistantly between the longer sides of the smaller panel opening regardless of the panel thickness P/P'. FIG. 7 illustrates this feature to best advantage, and shows that the resilient wings 30, 30 do tend to center the case 10 in the opening. Even in the larger opening, shown in FIG. 4 by the phantom lines, the outwardly inclined lower outside edges 30c, 30c of the wings 30, 30 will tend to locate the case 10 in the opening during mounting of the case in such a panel opening.

I claim:

1. A switch case adapted to being mounted in variously sized rectangular panel openings, said openings having side and end edges, and wherein the panels may have a range of thickness, said case comprising an upwardly open rectangular housing having first and second opposed pairs of walls associated with said opening side edges and end edges, said walls integrally joined at their adjacent vertical edges to form four corners, said housing having a bottom wall integrally joined to the bottom edges of said pairs of walls, said housing also having an integrally formed outwardly extending peripheral flange adjacent the upper edges of said first and second pairs of walls, and four resilient wings integrally connected to the bottom edges of one of said first and second pairs of walls, said wings arranged in adjacent pairs proximate said corners, said wings normally projecting upwardly and outwardly with respect to the pair of walls said wings are connected to so that upper end portions thereof can be resiliently biased to move toward the pair of walls said wings are connected to, said upper end portion having outside edges which normally extend out beyond the pair of walls said wings are not connected to so that said outside edges are adapted to engage the side edges or end edges of rectangular panel openings not associated with said pair of housing walls to which said wings are connected to resiliently bias said wings to move parallel to said walls said wings are connected to and toward one another.

2. The switch case of claim 1 wherein said resilient wings are integrally connected to the bottom edges of said housing end walls, said outside edges projecting laterally outwardly of the housing side walls so that said upper end portions define side edge surfaces, said side edge surfaces having steps that taper inwardly to engage the sides of panel openings of various thickness.

3. The switch case of claim 2 wherein said resilient wings have inside edges which are spaced from one another to permit flexing of said resilient wings toward one another as the case is being mounted in a panel opening.

4. The switch case of claim 3 wherein said wing upper end portions also define inwardly tapered steps in said end surfaces thereof, said steps in said end surfaces being oriented parallel to said mounting flange at least when said wings are in their normal undeformed condition.

5. The switch case of claim 4 wherein said steps in said outside edge surfaces of said wings are oriented at acute angles to said mounting flange at least when said wings are in their normal undeformed condition.

* * * * *